(12) United States Patent
Santos Silva Serra Duarte

(10) Patent No.: US 9,302,590 B2
(45) Date of Patent: Apr. 5, 2016

(54) SOLAR STATION FOR CHARGING ELECTRIC VEHICLES

(75) Inventor: João Nuno Santos Silva Serra Duarte, Covilhã (PT)

(73) Assignee: ENFORCE—ENGENHARIA DA ENERGIA, SA, Covilhã (PT)

( * ) Notice: Subject to any disclaimer, the term of this patent is extended or adjusted under 35 U.S.C. 154(b) by 560 days.

(21) Appl. No.: 13/697,780

(22) PCT Filed: May 13, 2011

(86) PCT No.: PCT/PT2011/000016
§ 371 (c)(1),
(2), (4) Date: Jan. 30, 2013

(87) PCT Pub. No.: WO2011/142683
PCT Pub. Date: Nov. 17, 2011

(65) Prior Publication Data
US 2013/0127395 A1    May 23, 2013

(30) Foreign Application Priority Data

May 13, 2010  (PT) ........................................ 105121

(51) Int. Cl.
*B60L 11/18* (2006.01)
*H01L 31/04* (2014.01)
(Continued)

(52) U.S. Cl.
CPC ........... *B60L 11/1809* (2013.01); *B60L 11/185* (2013.01); *B60L 11/1824* (2013.01);
(Continued)

(58) Field of Classification Search
CPC ............ B60L 11/1809; B60L 11/1824; B60L 2230/22; H02J 3/383
USPC ....................................................... 320/101
See application file for complete search history.

(56) References Cited

U.S. PATENT DOCUMENTS 5,315,227 A * 5/1994 Pierson et al. ................. 320/101
5,852,353 A * 12/1998 Kochanneck ................. 318/558
(Continued)

FOREIGN PATENT DOCUMENTS

DE    20 2009 01192    12/2009
GB     2 429 343 A      2/2007
(Continued)

OTHER PUBLICATIONS

Lamb et al.,"Efficient Photovoltaic Charging of Electric Vehicles", Mar. 1994, IEEE Southcon/94, conference record pp. 47-52.*
(Continued)

*Primary Examiner* — Sun Lin
(74) *Attorney, Agent, or Firm* — John P. White; Cooper & Dunham LLP

(57) ABSTRACT

The present invention answers the need for the existence of a network for charging electric vehicles (EV), particularly with regard to the so-called fast charging (20 to 30 minutes). Therefore, this station is intended for, inter alia, parking areas of public and private buildings, and fossil fuels service stations, such places where the slow charging is not very viable, since this type of charging (6 to 8 hours) will be done mostly at night. The present invention envisages the charging of EVs within a short period of time and with the particularity of being renewable energy produced on site, being possible to produce in one place the electrical energy necessary do power the EVs, since it includes structures of photovoltaic panels and equipment for the transformation of energy and the fast charging of the existing DC batteries in the EVs.

19 Claims, 2 Drawing Sheets

(51) Int. Cl.
   *H01M 10/46* (2006.01)
   *H02J 3/38* (2006.01)
   *E04H 6/02* (2006.01)
   *H02J 7/00* (2006.01)
   *H02S 20/10* (2014.01)

(52) U.S. Cl.
   CPC ............. *E04H6/025* (2013.01); *H01M 10/465* (2013.01); *H02J 3/383* (2013.01); *H02J 7/0027* (2013.01); *H02S 20/10* (2014.12); *B60L 2230/22* (2013.01); *Y02B 10/14* (2013.01); *Y02E 10/563* (2013.01); *Y02E 60/721* (2013.01); *Y02T 10/7005* (2013.01); *Y02T 10/7055* (2013.01); *Y02T 10/7094* (2013.01); *Y02T 90/121* (2013.01); *Y02T 90/128* (2013.01); *Y02T 90/14* (2013.01); *Y04S 10/126* (2013.01)

(56) References Cited

U.S. PATENT DOCUMENTS

| | | | |
|---|---|---|---|
| 2004/0169489 | A1 | 9/2004 | Hobbs |
| 2009/0184689 | A1 | 7/2009 | Kressner |
| 2011/0025267 | A1* | 2/2011 | Kamen et al. ................ 320/109 |
| 2011/0049992 | A1* | 3/2011 | Sant'Anselmo et al. ....... 307/64 |
| 2012/0098480 | A1* | 4/2012 | David ........................... 320/101 |
| 2012/0304552 | A1* | 12/2012 | Cox ................................. 52/73 |

FOREIGN PATENT DOCUMENTS

| | | | |
|---|---|---|---|
| GB | 2 438 979 A | 12/2007 | |
| GB | 2 462 677 A | 2/2010 | |
| WO | WO 2010/042550 A2 | 4/2010 | |

OTHER PUBLICATIONS

Abella et al.,"Photovoltaic Charging Station for Electrical Vehicles", May 2003, $3^{rd}$ World Conference on Photovoltaic Energy Conversion, conference record pp. 2280-2283.*

Gamboa et al., "Control Strategy of Multi-Port, Grid Connected, Direct-DC PV Charging Station for Plug-in Electric Vehicles", Sep. 2010, IEEE Energy Conversion Congress and Exposition (ECCE) conference, conference record pp. 1173-1177.*

Alonso Abella, M. and Chenlo, F. (2003). Photovoltaic charging station for electrical vehicles. WCPEC-3, Proceedings of the 3rd World Conference on Photovoltaic Energy Conversion, WCPEC3 Organizing Committee, 1-4.

Lamb, H. C. et al. (1994). Efficient Photovoltaic Charging of Electric Vehicles. Southcon /94, Conference Record, 47-52.

International Search Report, mailed Oct. 14, 2011 in connection with PCT International Application No. PCT/PT2011/000016, filed May 13, 2011.

Written Opinion of the International Searching Authority, mailed Oct. 14, 2011 in connection with PCT International Application No. PCT/PT2011/000016, filed May 13, 2011.

Notification Concerning Transmittal of International Preliminary Report on Patentability (Chapter I of the Patent Cooperation Treaty), including an International Preliminary Report on Patentability and Written Opinion of the International Searching Authority, mailed Nov. 22, 2012 by the International Bureau of WIPO in connection with PCT International Application No. PCT/PT2011/000016, filed May 13, 2011.

* cited by examiner

SOLAR STATION FOR CHARGING ELECTRIC VEHICLES

CROSS-REFERENCE TO RELATED APPLICATIONS

This application is a §371 national stage of PCT International Application No. PCT/PT2011/000016, filed May 13, 2011, claiming priority of Portuguese Patent Application No. 105121, filed May 13, 2010, the contents Of each of which are hereby incorporated by reference in their entirety.

TECHNICAL FIELD OF THE INVENTION

The present invention relates to a solar station for charging electrical vehicles, more specifically, a station built to house equipment in a central core for both charging electric vehicles and the production of solar photovoltaic energy.

SUMMARY OF THE INVENTION

Within the electrical mobility scope and with the success, in the very near future, of electric cars, it will be of extreme importance the existence of a network of distribution/charging points to respond to the various users of this type of vehicles. The solar station for charging electrical cars, hereinafter referred to as solar station or i-ES, aims to provide the main traffic and access areas of electrical vehicles with a place where they can be supplied/recharged in a convenient, fast and sustainable manner. The present invention also allows to give form, in an integrated way, to the progressive integration of systems of microgeneration of energy and of electric vehicles in the national grid. The solution has its component of renewable energy production, including a solar photovoltaic system, the component of charging of the electric vehicles (direct charging, without change of batteries) and its entire interface with the users, in a user-friendly concept, and furthermore the system of measurement and recording of the energy produced and/or supplied. The design of the solar structure, as an individual module, ensures its integration with the various environmental spaces and the maximisation of solar exposure, as a fixed structure. The centralisation of electrical equipment in a central core, to which the support structures of the solar panels as well as the connections to the network and electrical vehicles physically converge, is another important differentiation given that it simplifies construction and reduces costs associated with power losses.

BACKGROUND OF THE INVENTION

US Patent 2009327165 discloses a battery recharging system adaptable to car parks, to supply cars, which uses solar energy. In the solution of the station of the present invention no change of batteries of the EVs is envisaged, unlike above-mentioned document, which refers to this exchange of batteries on the site and all the logistics associated therewith. On the other hand, the system presented in this document does not guarantee universal charge of the full range of electrical vehicles (EVs), since it is directly dependent on the type of battery used in the EVs, their location and accessibility. Moreover, the system does not anticipate any kind of production of electrical energy at the charging sites.

The preamble of claim 1 is defined according to this document.

U.S. Pat. No. 5,315,227 discloses a battery recharging station for electric vehicles such that if the solar energy is insufficient, the energy network is used. The solution in this document is not intended for public places, foreseeing the installation and interconnection with a dwelling. The system disclosed has a loss of energy efficiency since the energy is first stored in batteries (direct current energy) and only afterwards conveyed to the EV. In the solution of the above-mentioned document the following points/references are not guaranteed:

fast and total charging of the EV, since in this document it refers to an energy transfer between two banks of batteries, without the use of energy consumed via housing;

utilisation of the renewable energy produced in its entirety, since in this document if there is solar radiation and the battery bank is fully charged, this energy will be wasted.

JP Patent 8019193 discloses a simplified system of photovoltaic energy for vehicles, specially adapted for residential housing. The solution in this document is not intended for public places, foreseeing the installation and interconnection with a dwelling. Moreover, it is a domestic photovoltaic system, with a system which only allows low power and therefore, long charging times (there is not enough power for fast charging).

DESCRIPTION OF THE INVENTION

The Solar Charging Station of the present invention answers the need for the existence of a network for charging electric vehicles (EV), particularly in regard to the so-called fast charging (20 to 30 minutes), that is, in all situations where the user can not afford to spend an extended period of time to perform the charging of his vehicle. Therefore, this station is intended for public and private places including parking areas of public and private buildings, fossil fuels service stations, such places where the slow charging is not very viable, since this type of charging (6 to 8 hours) will be done mostly at night.

Thus, the present invention includes the form of charging EVs in a short period of time and with the particularity of being renewable energy produced on site.

With the station of the present invention it is possible to produce in the same place the electric energy needed to power de EVs, given that it is a solution that integrates the production of energy through photovoltaic technology, and the transformation of energy for fast charging of the existing DC batteries in the EVs.

This way, the integrated system allows the increase of the global energy efficiency of a network for charging EVs, compared with an analogue network where for each charging point there is no system of energy production. It is known that the transport of energy from the central production site to the place of consumption, translates into a very significant loss for the distribution network.

Moreover, the structure itself that supports the production system, serves as a buffer and shading to the EVs minimising the duplication of metalomechanical material to be used for this purpose. On the other hand, given the concentration of both equipment (production and consumption of energy), there is a sharing/profitability of all wiring in the interconnections from the production points to the points of consumption. The same is true with regards to the implementation of bases of support of concrete or equivalent, to fix the structure of shading and support of photovoltaic modules.

Regarding the use of human resources, the solution of the present invention works without the need for the presence and support of an operator on site.

Due to its scope and applicability the solar station allows to contribute to the reduction on the dependence from abroad in energy terms (import of electric energy), promotes urban mobility in a sustainable manner, further contributes to reach a zero balance of power consumed and CO2 emitted by electric vehicles and contributes to a greater availability from the national grid at peak hours. On the other hand, it significantly reduces energy loss in transportation, since the energy production is located at the place where it is consumed, it allows the integration of photovoltaic (BIPV) and contributes to improving the energy rating of the building where it is housed. The present invention can be installed on any private or public space provided there is enough power available (in the public network or private PT), according to the needs of fast charging of the batteries. Preferred targets are public or company car parks, the existing service stations of fossil fuel, hypermarkets, shopping centres, hotels, hospitals, schools, among others.

The solution of the present invention is innovative regarding the high care in minimising power losses and inefficiencies. It is known that the transmission of electric energy entails losses. This solution avoids the traditional transmission and distribution losses of energy, in the order of 15% a 20%, that the conventional solution of the charging point connected to the distribution network presents. Energy production in a decentralised manner at the sites of consumption—charging of EVs—allows for a balance of energy with the electric network with the same ratio of energy required for the charging of vehicles.

The location of the electric equipment in a central core, whether radial, or linear (backbone type), from which emanate the connections to the grid, to the electric vehicles and solar panels, allows a constructive saving and an effective reduction in power losses along the very structure of the station.

The radial structure is more clearly illustrated if using a plurality of such stations (FIGS. 1 and 2), which therefore will be preferably arranged radially from a central point. A person of ordinary skill in the art will easily appreciate that the technical effects of the present invention are obtained regardless of the number of stations disposed around this central point, with the number of 3 stations in the FIGS. 1 and 2 being merely illustrative and the number can be easily variable.

The linear structure is more clearly illustrated if a plurality of stations of this type is used (FIG. 3), which therefore preferably will be disposed longitudinally, side-by-side. Still more preferably, the stations may be disposed also longitudinally but along two parallel lines, back-to-back. In both of theses preferred embodiments, this structure thus grows linearly.

DESCRIPTION OF THE FIGURES

For an easier understanding of the invention there are attached figures, which represent preferred embodiments of the invention which however, are not intended to limit the object of this invention.

DETAILED DESCRIPTION OF THE INVENTION

The present invention relates to a solar power station to feed electrical vehicles (EVs). With this station, it is intended, beyond the simple charging of the EVs, to make a compensation for the public grid of renewable energy, in peak hours and full hours of the load diagram, and withdrawn by the EV, from this network. This way, the solution prevents 15% to 20% of energy losses in the transmission and distribution until the charging of the EV. The solution further creates on the user the notion of "green" energy, maximising the use of EV, from the perspective of environmental responsibility.

Figure 1:
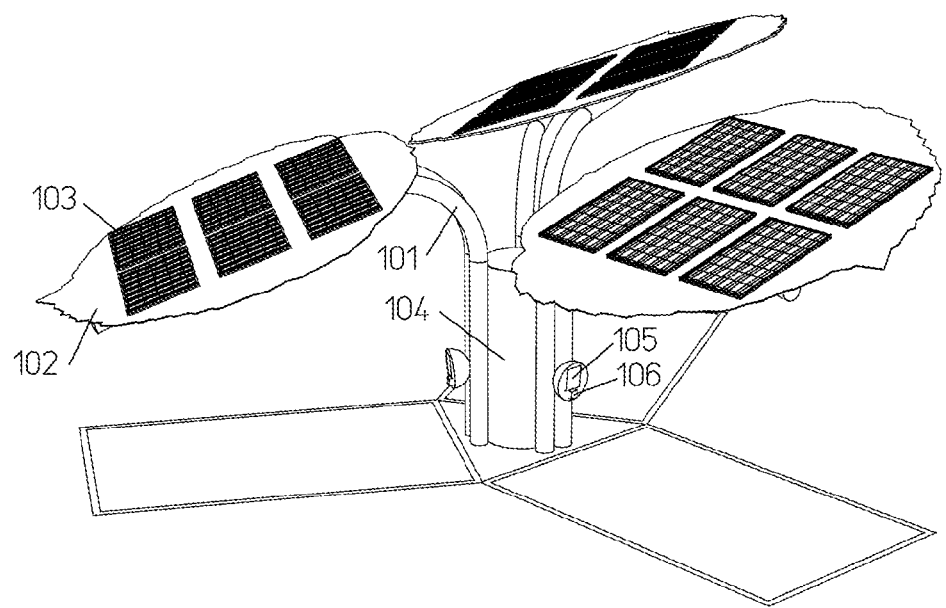
FIG. 1: Schematic illustration of the solar station for charging of electrical vehicles, in the radial solution around a central point, in which
(101) represents the metal attachment structure,
(102) represents the support structure for the photovoltaic panels,
(103) represents the photovoltaic panels,
(104) represents the central cabinet for housing the electric equipment,
(105) represents the display screen of interface with the client, and
(106) represents the socket of the charging point.
Figure 2:
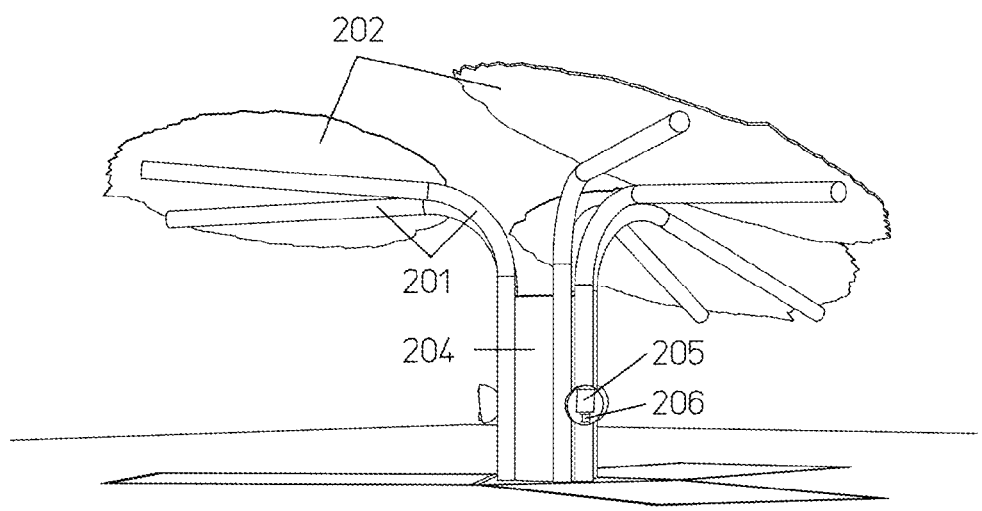
FIG. 2: Schematic illustration of the solar station for charging of electrical vehicles, in the radial solution around a central point, in which
(201) represents the metal attachment structure,
(202) represents the support structure for the photovoltaic panels,
(204) represents the central cabinet for housing the electric equipment,
(205) represents the display screen of interface with the client, and
(206) represents the socket of the charging point.
Figure 3:
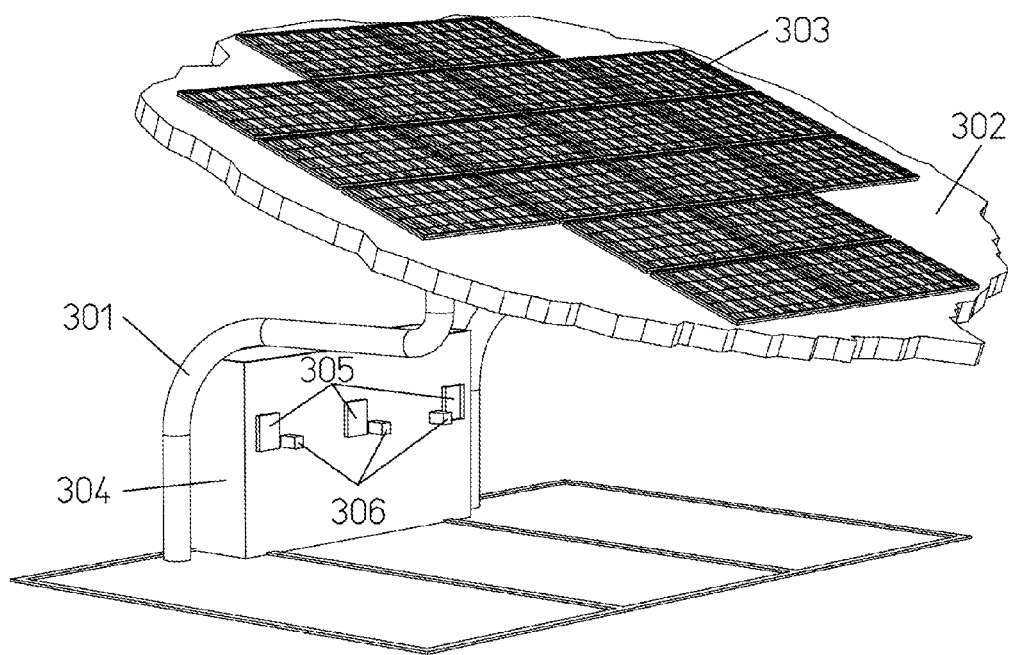
FIG. 3: Schematic illustration of the solar station for charging of electrical vehicles, in the linear solution of the backbone type, in which
(301) represents the metal attachment structure,
(302) represents the support structure for the photovoltaic panels,
(303) represents the photovoltaic panels,
(304) represents the central cabinet for housing the electric equipment,
(305) represents the display screen of interface with the client, and
(306) represents the socket of the charging point.
Figure 4:
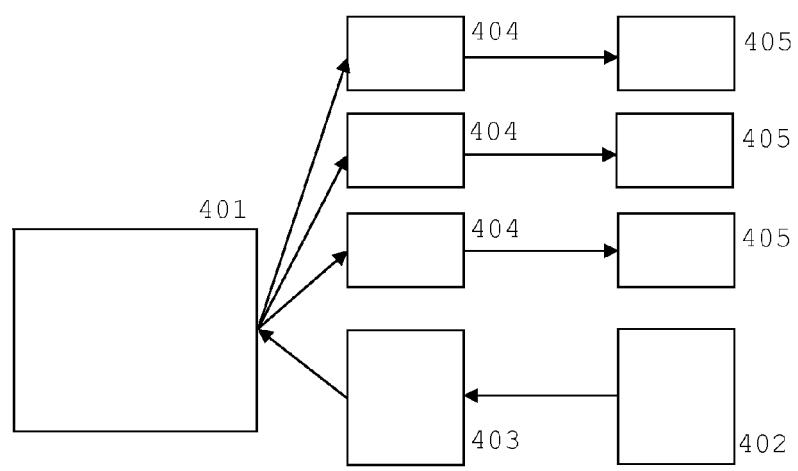
FIG. 4: Block diagram of the main elements of the solar station for charging of electrical vehicles, in which
(401) represents the public grid,
(402) represents the array of photovoltaic panels,
(403) represents the inverter block of production, equipment suitable for the production of electricity from photovoltaic panels,
(404) represents the fast-charging point which includes electrical equipment suitable for charging the battery or batteries of said electric vehicles, and
(405) represents the electrical vehicle.

The present invention comprises a set of elements schematically represented in the block diagram shown (FIG. 4), that from the technical point of view can be disaggregated into four sub-systems, as described below in the form of various preferential embodiments:

Energy Production System

The energy production system of the present invention makes use of the solar photovoltaic technology and systems connected to the network. Thus, this system consists of polycrystalline photovoltaic panels that define the solar field, a DC/AC single-phase inverter with a nominal power of 3.68 kW, all DC wiring required for the interconnection of these equipment and an AC protection framework (class II insulation) composed of differential switch and bipolar circuit breaker. All the energy produced by the photovoltaic system is injected into the public grid and is mostly produced in peak hours and full hours of the load diagram of consumption. The inverter device synchronises with the network, ensuring the quality of the energy injected, the consumption being ensured by the production itself (self-consumption regimen).

Battery Charging System

The present invention provides for the existence of three charging-points of vehicle simultaneously. For this purpose, there exists a charging control unit that manages the charging characteristics in relation to the number of vehicles being charged at the solar station. The type of charge used in the present invention is the so-called fast charging with a maximum power of 43 kW, in AC and/or DC regimen, with a duration ranging from twenty to thirty minutes. The feeding will preferentially be of the triphasic type, the present invention providing the respective socket for interconnection with the vehicle. The interconnecting cable to the electric vehicle is made available by the brand of the car, since the connection socket may vary according to the manufacturer.

Energy Measurement System

Accounting for all transit of energy involved in the present invention is made with the use of bidirectional counters preferably triphase direct connection. Therefore, it is necessary a counter to measure all the energy produced by the photovoltaic system, one to measure the overall energy consumed by the present invention and other, preferable three counters (these named individuals) which independently account for the energy provided to each charging point, i.e., to each electric vehicle. This way, there is a full perception of the energy flows and the totals consumed/produced at each point of the present invention.

Interface with the Client

The present invention preferably provides a customer service which is intuitive and easy to use. Using a display and an alphanumeric keyboard the client indicates his intention with regards to the amount of time or cost to spend on the charge. Using a GSM modem a SMS is sent to the customer's mobile phone with the confirmation of his intention and a validation code for the authentication of the user-payer. Once introduced, the code will generate a new SMS (this of value added) to confirm the transaction.

The following claims further define the preferred embodiments of the present invention.

The invention claimed is:

1. A station for solar charging of electric vehicles, the station comprising:
    one or more photovoltaic panels;
    structures for fixation and support of the one or more photovoltaic panels;
    an electrical equipment for charging battery or batteries of said electric vehicles and for providing electrical energy from the one or more photovoltaic panels to a network; and
    an additional central cabinet which houses the electrical equipment and from which are mounted the structures to support the one or more photovoltaic panels,
    wherein said electrical equipment is configured to,
        when charging an electric vehicle of the one or more electric vehicles, use the electrical energy from the network and the electrical energy from the one or more photovoltaic panels simultaneously to charge the battery or batteries of said electric vehicle, and
        when not charging an electric vehicle of the one or more electric vehicles, use the electrical energy from the one or more photovoltaic panels to supply the network.

2. The station according to claim 1, wherein the structures for fixation and support of the one or more photovoltaic panels are disposed in a radial form from said additional central cabinet.

3. The station according to claim 2, wherein the station further comprises one or more screens/displays to provide an interface for one or more station users.

4. The station according to claim 2, wherein the station further comprises one or more charging sockets to connect with the electric vehicles.

5. The station according to claim 4, the charging sockets for connection with the electric vehicles and the screens/displays for providing an interface to the one or more station users are placed in said additional central cabinet.

6. The station according to claim 2, wherein station is configured to send a SMS message to a mobile phone previously indicated by a station user when the station requires an authorization to charge the electric vehicles, when the station confirms the authorization to charge the electric vehicles, and/or when the station finishes charging the electric vehicles.

7. The station according to claim 1, wherein the structures for fixation and support of the one or more photovoltaic panels are disposed in a linear form linear from said additional central cabinet.

8. The station according to claim 7, wherein the station is configured to send a SMS message to a mobile phone previously indicated by a station user when the station requires an authorization to charge the electric vehicles, when the station confirms the authorization to charge the electric vehicles, and/or when the station finishes charging the electric vehicles.

9. The station according to claim 1, wherein the station further comprises one or more screens/displays to provide an interface for one or more station users.

10. The station according to claim 9, wherein the station further comprises one or more charging sockets for connecting with the electric vehicles and the screens/displays for providing an interface to the one or more station users are placed in said additional central cabinet.

11. The station according to claim 9, wherein the station is configured to send a SMS message to a mobile phone previously indicated by a station user when the station requires an authorization to charge the electric vehicles, when the station confirms the authorization to charge the electric vehicles, and/or when the station finishes charging the electric vehicles.

12. The station according to claim 1, wherein the station further comprises one or more charging sockets for connecting with the electric vehicles.

13. The station according to claim 12, where in the station further comprises one or more screens/displays, and wherein the charging sockets for connecting with the electric vehicle and the one or more screens/displays for providing an interface to the one or more station users are placed in said additional central cabinet.

14. The station according to claim 1, wherein the station further comprises one or more charging sockets to connect with the electric vehicles and one or more screens/displays to provide an interface for one or more station users, wherein the one or more charging sockets and the one or more screens/displays are placed in said additional central cabinet.

15. The station according to claim 1, wherein the station further comprises one or more screens/displays to provide an interface for one or more station users.

16. The station according to claim 15, where in the station further comprises one or more charging sockets to connect with the electric vehicles.

17. The station according to claim 16, wherein the charging sockets for connecting with the electric vehicles and the screens/displays for providing an interface to the one or more station users are placed in said additional central cabinet.

18. The station according to claim 1, wherein the station is configured to send a SMS message to a mobile phone previously indicated by a station user when the station requires an authorization to charge the electric vehicles, when the station confirms the authorization to charge the electric vehicles, and/or when the station finishes charging the electric vehicles.

19. A station for solar charging of electric vehicles, the station comprising:
one or more photovoltaic panels;
structures for fixation and support of the one or more photovoltaic panels; and
an electrical equipment for charging battery or batteries of said electric vehicles and for providing electrical energy from the one or more photovoltaic panels to a network,
wherein said electrical equipment is configured to,
when charging an electric vehicle of the one or more electric vehicles, use the electrical energy from the network and the electrical energy from the one or more photovoltaic panels simultaneously to charge the battery or batteries of said electric vehicle, and
when not charging an electric vehicle of the one or more electric vehicles, use the electrical energy from the one or more photovoltaic panels to supply the network, and
wherein the station is configured to send a SMS message to a mobile phone previously indicated by a station user when the station requires an authorization to charge the electric vehicles, when the station confirms the authorization to charge the electric vehicles, and/or when the station finishes charging the electric vehicles.

* * * * *